United States Patent [19]
Dombrowski et al.

[11] Patent Number: 4,964,491
[45] Date of Patent: Oct. 23, 1990

[54] SYSTEM FOR LIMITING SNAP LOAD INTENSITY

[75] Inventors: James H. Dombrowski, San Diego, Calif.; Herbert L. Mummery, Kaneohe, Hi.; Roger W. Buecher, Kaneohe, Hi.; Isao R. Yumori, Kaneohe, Hi.

[73] Assignee: The United States of America as represented by the Secretary of the Navy, Washington, D.C.

[21] Appl. No.: 380,950

[22] Filed: Jul. 11, 1989

[51] Int. Cl.⁵ .............................................. F16F 9/46
[52] U.S. Cl. .................................. 188/299; 188/280; 254/277; 254/392; 207/34; 207/113; 207/118
[58] Field of Search .................. 267/34, 118, 113, 125, 267/128; 188/315, 299, 297, 280, 275, 285, 65.1, 65.2; 254/277, 392

[56] References Cited

U.S. PATENT DOCUMENTS

| | | | |
|---|---|---|---|
| 2,136,596 | 11/1938 | Smith | 254/277 X |
| 3,476,354 | 11/1969 | Stubblefield | 267/34 |
| 3,512,657 | 5/1970 | Chambers | 254/277 X |
| 3,734,478 | 5/1973 | Lohr | 267/34 |
| 3,857,555 | 12/1974 | Mori et al. | 267/34 |
| 4,076,255 | 2/1978 | Houghton | 267/34 |
| 4,131,266 | 12/1978 | Carter | 267/34 |
| 4,630,542 | 12/1986 | Peyre et al. | 254/277 X |
| 4,724,970 | 2/1988 | Kühn | 254/277 X |

OTHER PUBLICATIONS

"Depth Compensated Shock Absorber", Douglas W. Murphy, Navy Case No. 59,377, Navy TOB V.1, #1, May '76.

*Primary Examiner*—Matthew C. Graham
*Attorney, Agent, or Firm*—Harvey Fendelman; Thomas Glenn Keough; Michael A. Kagan

[57] ABSTRACT

A system which limits the intensity of a snap load imposed in a tether or cable, used, for example, in the recovery of an object at sea, includes a floating plate for connection to the cable and a support housing for connection to the object being recovered. The system also includes an actuatable mechanism extending between and connected to the plate and housing. The actuatable mechanism is movable from an initial position toward a deflected position in response to the introduction of a snap load in the cable caused by the occurrence of the sudden removal of a slack condition in the cable. The system further includes a hydraulic or other fluid arrangement coupled to the actuatable mechanism for generating a shock load within the mechanism in response to the introduction of the snap load in the cable which permits movement of the mechanism toward the deflected position while limiting the tensile load imposed on the cable to a known value that the cable can withstand and reducing the separation velocity toward zero. The system also includes a restoring mechanism operable for causing extension of the actuatable mechanism from the deflected position back to the initial position in response upon reintroduction of another slack condition in the cable.

7 Claims, 3 Drawing Sheets

SYSTEM FOR LIMITING SNAP LOAD INTENSITY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to recovery operations at sea and, more particularly, to a system for limiting the intensity of snap loads introduced in a tether or cable used in the recovery operations at sea.

A surface support craft mounting a crane is commonly used in recovery at sea of objects, such as inoperative vehicles and submersible systems. During surface handling phases of recovery operations, snap loads can be introduced into the crane's cable caused by rolling and heaving of the surface support craft. Snap loads occur when there is a slack in the cable which produces a separation velocity between the object and the crane tip. These snap loads can introduce abnormally high tensile loads into the cable which, if severe enough, can part the cable resulting in loss of the object and/or damage to the crane or injury to the personnel.

Several approaches have been used in the past to isolate the cable from shock loads; however, all have disadvantages. One approach is to strengthen the cable sufficiently to withstand any snap loads that may occur. This approach may be reasonable in situations where the objects are small and light, however, not for larger, heavier objects. To increase cable strength requires increasing the cable diameter to the point where either the cable handling equipment or the cable drag becomes unacceptable. Also, though this approach insures against loss of the object, damage can still occur to the crane, other surface handling equipment, or the object since the snap load is still transmitted through the cable directly to these items.

Another approach is to provide a complex motion compensation system in the surface handling crane. This system compensates for the crane tip motion caused by movement of the surface support craft. However, the compensation system increases the overall size of the crane, limiting its utilization on most surface craft.

Still another approach is to utilize a pneumatic spring on the object to isolate the object and the cable. The primary disadvantage with this approach is that its effectiveness is dependent on the depth of the object. At depth, the increased ambient pressure compresses the pneumatic spring and eliminates its effectiveness in isolating the object from the shock of snap loads. A reliable system must be equally effective at different depths since snap loads can occur anywhere during recovery of the object.

In view of the above-described disadvantages of prior approaches, there is still a need for a reliable system for minimizing snap loads on the crane lift cable. The system must be effective independent of package size and depth.

SUMMARY OF THE INVENTION

The present invention provides a system designed to avoid the above-cited disadvantages and satisfy the aforementioned need. The system of the present invention is operable to limit the intensity of snap loads introduced into a tether or cable, such as used on a crane during recovery of an object at sea.

In its basic components, the snap load intensity limiting system comprises (a) a first support structure for connection to the cable; (b) a second support structure for connection to the object; (c) an actuatable mechanism extending between and connected to the first and second support structures, the actuatable mechanism being compressible from an initial position toward a deflected position in response to a snap load produced in the cable by the sudden removal of a slack condition in the cable due to a separation velocity between the crane tip and the object; and (d) an arrangement of components coupled to the actuatable mechanism for generating a shock load within the actuatable mechanism in response to the cable snap load which permits compression of the mechanism toward the deflected position while limiting the tensile load imposed on the cable to a known value that the cable can withstand and simultaneously reducing the separation velocity. The actuatable mechanism is also extendible from the deflected position back to the initial position in response to reintroduction of another slack condition in the cable. A restoring mechanism is provided in the system which is operable for causing extension of the actuatable mechanism from the deflected position back to the initial position.

OBJECTS OF THE INVENTION

Accordingly, it is the primary object of the present invention to disclose a novel system which limits the intensity of snap loads introduced on a tether or cable, such as used in recovery operations at sea.

Another object of the present invention is to disclose a novel system which limits the snap load intensity by limiting the shock load applied on the cable and the consequent tensile load seen by the cable to a known value that the cable can withstand.

Still another object of the present invention is to disclose a novel system which deflects sufficiently to allow the limited shock load to reduce the separation velocity between a tethered object and the crane tip to zero as slack is eliminated in the cable.

A further object of the present invention is to disclose a novel system which incorporates a relief valve whose setting can be changed to adjust the system to accommodate varied object weights and cable strengths by limiting the shock load seen by the cable.

A still further object of the present invention is to disclose a novel system which is fully compensated to ambient pressure of air or sea water.

Yet another object of the present invention to disclose a novel system which incorporates a mechanism for restoring the system to its initial starting position.

Still another object of the present invention is to disclose a novel system which is reliable and effective independent of object size and submersion depth.

Other objects, advantages and novel features of the invention will become apparent from the following detailed description of the invention when considered in conjunction with the accompanying drawings.

DETAILED DESCRIPTION OF THE INVENTION

Figure 1:
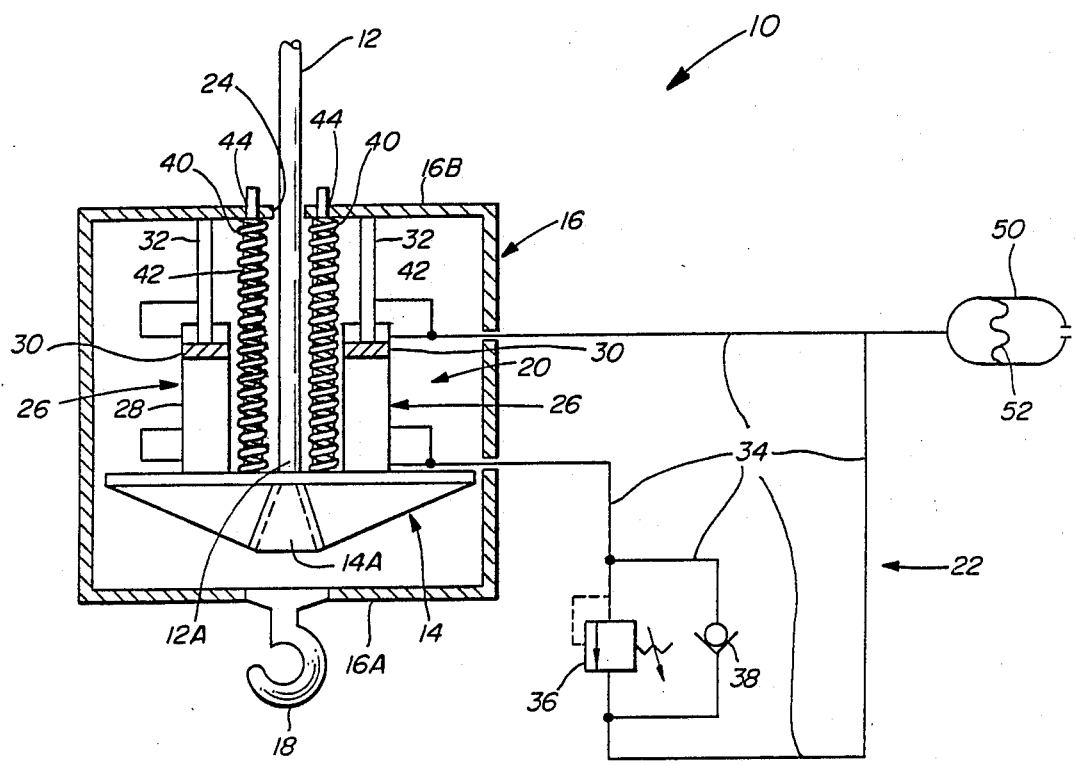
FIG. 1 is a schematic elevational view of the preferred embodiment of a snap load intensity limiting system in accordance with the principles of the present invention.

Referring now to the drawings, and particularly to FIG. 1, there is shown a preferred embodiment of a snap load intensity limiting system in accordance with the present invention, being identified by the numeral 10. The system of the present invention is operable to limit the intensity of snap loads introduced in a tether or cable 12, such as one mounted from a crane (not shown) used in operations for recovery of an object at sea.

In its basic components, the snap load intensity limiting system 10 includes a first support structure in the form of a floating plate 14 and a second support structure in the form of a support enclosure or housing 16. The plate 14 has a central termination cone 14A to which is rigidly connected a lower end 12A of the cable 12. The support housing 16 has a hook element 18 attached to its bottom wall 16A to which the object (not shown) to be recovered would be connected. The system 10 also includes an actuatable mechanism 20 and an arrangement 22 of components associated therewith. The plate 14 and actuatable mechanism 20 are disposed within the support housing 16 with the cable 12 extending downwardly through an opening 24 in a top wall 16B of the housing and the actuatable mechanism 20 connected to the top wall 16B and supporting the plate 14 therefrom. The components of the arrangement 22 would be mounted on either the exterior or interior of the walls of the housing 16 or on the floating plate 14. Thus, it can be seen that the system 10 would be utilized as a separate, small, lightweight package located between the package to be lifted and the end 12A of the cable 12.

The actuatable mechanism 20 of the snap load intensity limiting system 10 is compressible from an initial position, as seen in FIG. 1, toward a deflected position (not shown) and then extendible back to the initial position. Compression of the mechanism 20 toward the deflected position will occur in response to movement of the plate 14 and top wall 16B toward one another at a separation velocity produced by the occurrence or introduction, and then followed by the removal, of a slack condition in the cable 12, such as when surface support craft and crane thereon (not shown) supporting the cable 12 roll and heave on the sea toward and away from the object to be lifted.

The actuatable mechanism 20 will remain in the deflected position until removal of the cable lifting load in response to a slack condition recurring in the cable 12. Thus, extension of the mechanism 20 will occur in response to reintroduction of another slack condition in the cable 12. This process will "reset" the mechanism 20 in preparation for a follow-on snap load.

If the snap load intensity limiting system 10 of the present invention was not interposed between the cable 12 and the object being recovered, then as the slack condition is removed from the cable 12, the separation velocity would impose a high, potentially damaging, snap load on the cable 12. However, a shock load produced by the system 10 of the present invention limits the intensity of the snap load on the cable 12 to a level which the cable can withstand.

Preferably, the actuatable mechanism 20 of the system 10 employs hydraulic fluid; alternatively, pneumatic fluid can be utilized. The mechanism 20 includes one or more actuators 26. Each actuator 26 has an elongated hollow cylinder 28 containing hydraulic fluid. Each cylinder 28 is rigidly attached to and mounted in an upright position on the floating plate 14. Each actuator 26 also has a piston 30 with a rod 32 attached at its outer end to the top wall 16B of the support housing 16 spaced above the floating plate 14. The piston 30 is mounted in the cylinder 2 for reciprocal movement through compression and return strokes to permit the aforementioned compression and expansion of the mechanism 20 between its initial and deflected positions.

The arrangement of components 22 of the snap load intensity limiting system 10 coupled to the actuatable mechanism 20 cooperate to generate the hydraulic shock load within the mechanism 20 which limits the intensity of a snap load on the cable 12. Compression of actuatable mechanism 20 toward its deflected position generates the hydraulic shock load while, at the same time, limiting the tensile load imposed on the cable 12 to a known value that the cable can withstand and reducing the relative separation velocity of the plate 14 relative to the housing 16 toward zero.

More particularly, the hydraulic shock load generating components 22 of the system 10 include a hydraulic circuit 34 connected to each actuator cylinder 28 in flow communication with opposite compression (lower) and return (upper) sides of piston 30. The hydraulic circuit 34 and each cylinder 28 contain hydraulic fluid which can flow between the compression and return sides of the piston 30 via the circuit 34. The components 22 further include a relief valve 36 and a check valve 38 coupled to hydraulic circuit 34 in parallel with one another. The check valve 38 prevents fluid flow through it from the compression to return sides of the piston 30, but permits fluid flow through it from the return to compression sides of the piston 30, bypassing the relief valve 36.

Therefore, due to the presence of the check valve 38, the piston 30 is always free to move through its return stroke to return the actuatable mechanism 20 to its initial position. For this purpose, a restoring mechanism 40, preferably, as seen in FIG. 1, in the form of one or more elongated light rate compression springs extending between the plate 14 and housing 16, is provided in the system 10 for biasing the actuatable mechanism 20 back to its initial position. A rod 42 extends axially through each spring 40 between the plate 14 and the housing 16 for preventing the spring from buckling as it is compressed. Each rod 42 is attached at its lower end to the plate 14 and extending through an opening 44 in the housing top wall 16B for sliding movement relative thereto as the housing 16 moves relative to the plate 14.

The relief valve 36 is adjustable so that its setting can be changed to preset the magnitude of the hydraulic shock load at the desired value or level. During normal lift conditions wherein the response of the system 10 to removal of a slack condition in the cable 12 is absent, the hydraulic pressure of the fluid in the circuit 34 is normally below the setting of the relief valve 36. The relief valve 36 is normally closed, preventing flow of hydraulic fluid through it in either direction. Thus, in absence of a snap load on the cable 12 the relief valve 36 and check valve 38 prevent fluid flow from the compression side to the return side of the piston 30 so as to maintain the piston 30 and thereby the actuatable mechanism 20 at its initial position.

When a slack condition is introduced in and then removed from the cable 12 producing a snap load thereon, tension is placed on the cable 12 and the snap load is transferred from the cable 12 to the floating plate 14. This causes the plate 14 to move relative to the housing 16 initially at the separation velocity of the crane tip relative to the object and compress the actuatable mechanism 20, increasing the hydraulic pressure within the cylinders 28 to above the setting of the relief valve 36.

Once its preset pressure level has been exceeded, the relief valve 36 shifts and opens the hydraulic circuit 34 permitting fluid flow and movement of the piston 34 along its compression stroke and compression of the actuatable mechanism 20 toward its deflected position. The hydraulic pressure generated by the setting of the relief valve 36 creates the hydraulic shock load in the cylinder 28 on the compression side of the piston 30 which stabilizes the cable load to a known value while reducing the separation velocity. The mechanism 20 will continue to compress toward its deflected position until the separation velocity between the plate 14 and housing 16 has reduced to zero.

Figure 2:
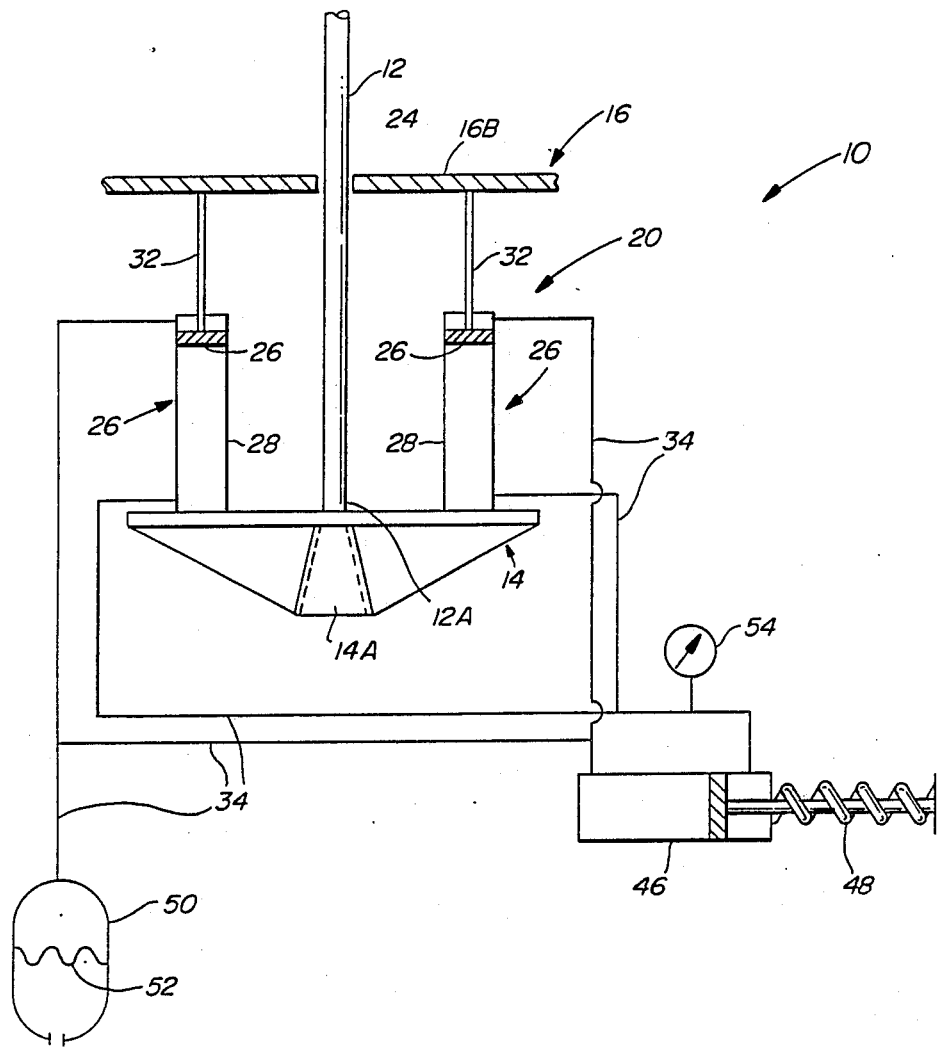
FIG. 2 is a schematic elevational view of a modified embodiment of the system of the present invention.

Referring to FIG. 2, the one modified embodiment of the snap load intensity limiting system 10 only differs from the preferred embodiment in the following respects. Instead of the relief valve 36, check valve 38, and return springs 40, a hydraulic "spring" cylinder 46 and a biasing spring 48 associated therewith are used. The biasing spring 48 is attached to the spring cylinder 46 so that the former is compressed when the latter compresses. The combination provides the hydraulic pressure and consequent hydraulic shock load required to decrease the separation velocity to zero and return the actuatable mechanism 20 to its initial position.

During initial stages of the compression of the actuatable mechanism 20 in FIG. 2, the hydraulic shock load is created by the dampening effect of the hydraulic fluid in the circuit 34. This damping is provided by passage of the hydraulic fluid through the circuit 34. As the separation velocity declines, the dampening load will drop at the same time. At this stage the shock load will be provided by the spring cylinder 46. As the spring cylinder 48 compresses, the load created by deflection of the spring(s) is transferred into a hydraulic pressure increase which now provides the shock load required to reduce the separation velocity. The shock load seen by the cable 12 can be adjusted, for example, by changing the spring rate of the spring 48.

Figure 3:
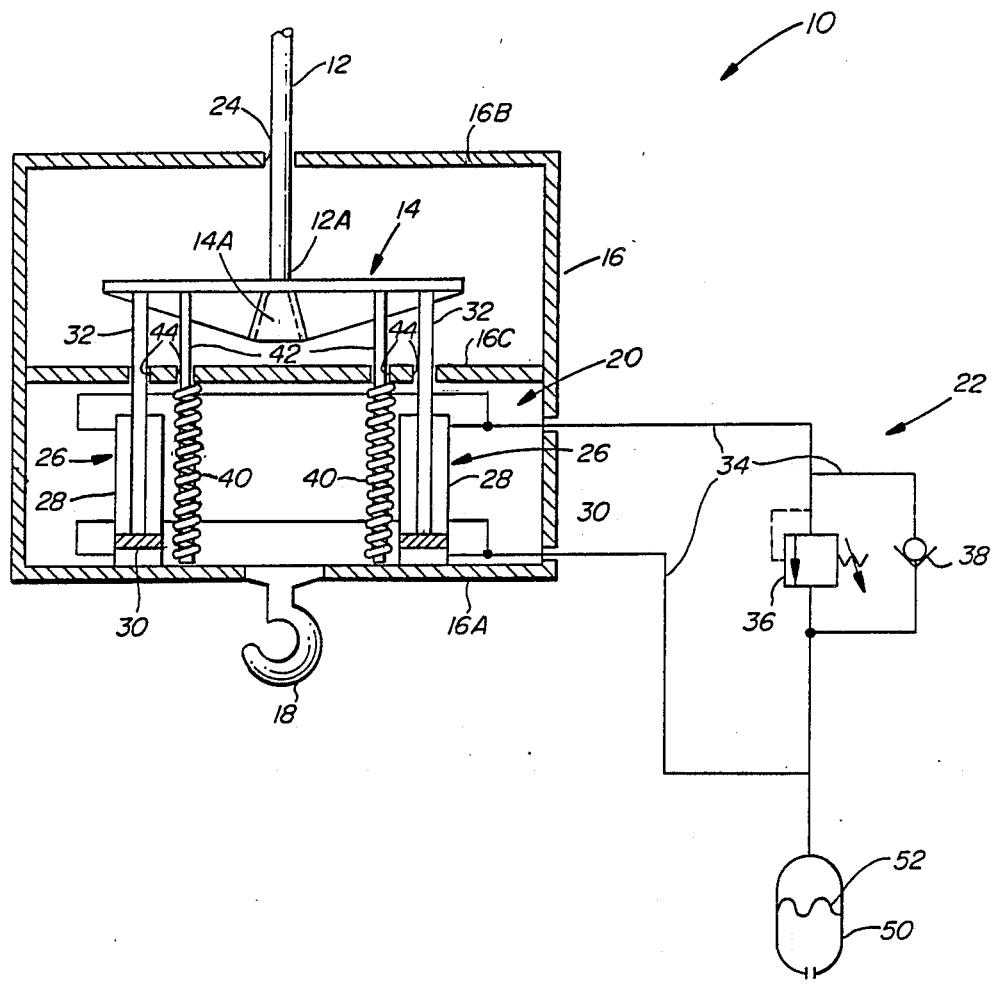
FIG. 3 is a schematic elevational view of another modified embodiment of the system of the present invention.

Referring to FIG. 3, the other modified embodiment of the snap load intensity limiting system 10 only differs from the preferred embodiment in the following respects. Each cylinder 28 is rigidly attached to and mounted in an upright position on the bottom wall 16A of the housing 16 and each piston rod 32 is attached at its outer end to the the floating plate 14. The support rods 42 extending axially through each return spring 40 are attached at their upper ends to the floating plate 14. The piston rods 32 and support rods 42 extend through apertures 44 in an intermediate wall 16C of the housing 16 for movement therethrough. The upper ends of the springs 40 engage the underside of the intermediate housing wall 16C and are captured between the wall 16C and lower ends of the support rods 42.

Now, the actuatable mechanism 20 is extendible from an initial position, as seen in FIG. 3, toward a deflected position (not shown) and then compressible back to the initial position. Extension of the mechanism 20 toward the deflected position will occur in response to movement of the plate 14 and bottom wall 16B away from one another upon the removal of a slack condition in the cable 12 and introduction of a snap load therein. The actuatable mechanism 20 will remain in the deflected position until removal of the cable lifting load in response to a slack condition recurring in the cable 12.

In all embodiments of the system 10, a compensator 50 having a bladder 52 which separate hydraulic fluid or oil from air or sea water is coupled to the hydraulic circuit 34. The compensator 50 compensates the system 10 to ambient air or sea water pressure, and takes up the excess hydraulic fluid flow between the extension and return strokes of the actuatable mechanism 20. Further, cable tension can be monitored by reading the system's hydraulic pressure on a gauge 54 coupled to the pressure portion of the circuit 34.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely exemplary embodiments thereof. For instance, while the embodiments of the invention described above refer to actuatable mechanisms including two cylinder/pistons, it is within the scope of the present invention that other numbers may be used, e.g. one, three or more.

Having thus described the invention, what is claimed is:

1. A system for limiting the intensity of a snap load in a cable having tensile limits which is supporting an object, comprising:
   a floating plate connected to the cable;
   a housing connected to the object, said floating plate being disposed within said housing;
   an arcuatable mechanism extending between and connected to the floating plate and the housing, the actuatable mechanism being movable from an initial position toward a deflected position in response to a snap load produced in the cable, the actuatable mechanism being disposed within the housing; and
   means coupled to the actuatable mechanism for generating a shock load within the actuatable mechanism in response to the cable snap load, the shock load permitting movement of the actuatable mechanism towards the deflected position while limiting the snap load within the tensile limits of the cable.

2. The system of claim 1 wherein said actuatable mechanism includes a plurality of actuators, each said actuator having a cylinder containing hydraulic fluid and being attached to said floating plate and a piston with a rod attached to a portion of said housing above said plate, said piston being mounted in said cylinder for movement through a compression stroke to permit compression of said mechanism from said initial position toward said deflected position.

3. The system of claim 2 wherein said shock load generating means includes:
   a hydraulic circuit connected to said cylinder of each actuator in flow communication with opposite compression and return sides of said piston and containing hydraulic fluid which can flow from said compression to said return side of said piston via said circuit in response to movement of said piston through said drive stroke; and means coupled to said hydraulic circuit in communication with said hydraulic fluid for generating a hydraulic pressure within said cylinder on said compression side of said piston to maintain said actuatable mechanism at its initial position during normal load conditions and for generating a hydraulic shock load within said cylinder on said compression side of said piston in response to the occurrence of a snap load caused by removal of a slack condition in the cable.

4. The system of claim 3 wherein said hydraulic pressure generating means includes a relief valve whose setting can be changed to adjust the magnitude of said hydraulic shock load.

5. The system of claim 3 wherein said hydraulic pressure generating means includes a spring whose rate can be changed to adjust the magnitude of said hydraulic shock load.

6. The system of claim 3 wherein said shock load generating means further includes means coupled to said hydraulic circuit in communication with said hydraulic fluid for compensating said hydraulic fluid for ambient pressure.

7. The system of claim 1 wherein said actuatable mechanism includes a plurality of actuators, each said actuator having a cylinder containing hydraulic fluid and being attached to a lower portion of said housing and a piston with a rod attached to said plate located above said lower housing portion, said piston being mounted in said cylinder for movement through an extension stroke to permit extension of said mechanism from said initial position toward said deflected position.

* * * * *